United States Patent [19]

Kodama

[11] 3,851,316

[45] Nov. 26, 1974

[54] SEMICONDUCTOR MEMORY DEVICE

[75] Inventor: Koji Kodama, Tokyo, Japan

[73] Assignee: Tokyo Shibaura Electric Co., Ltd., Kanagawa-ken, Japan

[22] Filed: Apr. 13, 1973

[21] Appl. No.: 350,720

[30] Foreign Application Priority Data

Apr. 14, 1972 Japan .............................. 47-037569

[52] U.S. Cl. ......................... 340/173 DR, 340/173 R

[51] Int. Cl. ......................... G11c 11/40, G11c 11/24

[58] Field of Search .............................. 340/173 DR

[56] References Cited

UNITED STATES PATENTS 3,705,392 12/1972 Appelt .......................... 340/173 DR 3,748,651 7/1973 Mesnik .......................... 340/173 DR 3,760,379 9/1973 Nibby .......................... 340/173 DR

*Primary Examiner*—Terrell W. Fears

*Attorney, Agent, or Firm*—Oblon, Fisher, Spivak, McClelland & Maier

[57] ABSTRACT

A semiconductor memory device which has time interval control means of the refresh cycle. In particular, the control means varies the time interval according to the temperature around the memory elements. In a preferred embodiment, the control means includes a thermistor arranged in the circuit with a capacitor so as to be responsive to the temperature variations.

6 Claims, 8 Drawing Figures

SEMICONDUCTOR MEMORY DEVICE

BACKGROUND OF THE INVENTION

1. Field of the Invention

This invention relates to semiconductor memory devices and, more particularly, to such memory devices which are useful as data storage devices for an electronic digital computer.

2. Description of the Prior Art

An MOS (Metal Oxide Semiconductor) type random access memory (hereinafter called RAM) finds wide use as a data storage device in an electronic digital computer. Generally, MOS-RAM are classified into two types: a static and a dynamic type of device. The memory elements of a static type of device are flip-flop circuits, such that storage information will not be destroyed during the period that the source voltages are supplied to the memory elements. The dynamic type of device is illustrated in FIG. 1 and comprises a gate floating capacitor C of the MOS transistor 1 and transistors 2 and 3. Storage information in the form of a "1" or "0" is established by the existence or non-existence of electric charges in the memory element, respectively. However, in this type of dynamic memory element, the electric charges discharge gradually through a leakage path. Therefore, it is necessary to recharge the device during a constant time interval in order to maintain the information stored therein. The above-mentioned recharging is generally referred to as the "refresh" action, and the constant time interval is generally referred to as the "refresh period" or "refresh time interval."

In FIG. 2, a representative dynamic type of MOS-RAM is illustrated the capacity of which is 1,024 words × 1 bit. In the one chip shown, four memory portions 11,12,13 and 14 are arranged symmetrically in two portions.

Each memory portion 11,12,13 and 14 comprises 256 bits (16 columns × 16 rows). The column decoders 15*a* and 15*b* and the row decoders 16*a* and 16*b* are provided for memory portions 11,12,13 and 14, and said columns and rows are selected by five bit addresses. A pair of refresh amplifiers 17 and 18 are provided, one for memory portions 11 and 12 and one for memory portions 13 and 14 in the row direction as shown. One column in the memory portions 11,12,13 and 14 is selected by a five bit address by the column decoders 15*a* and 15*b*, and then the information is read from all of the 32 memory elements existing in said columns. The refresh amplifier 17 or 18 will amplify the information in said 32 memory elements. Thus, the information will be rewritten in the memory elements of the selected column; and will then be simultaneously transmitted to the row decoders 16*a* and 16*b*. These row decoders 16*a* and 16*b* select the information from one of the 32 elements by a five bit address for transmission as the desired output. Since the 32 memory elements on one column are refreshed in one read cycle, 32 read cycles are necessary to refresh the 1,024 memory elements of all the addresses.

Thus, it is seen that in the past, the refresh action of a volatile semiconductor memory device took place during a constant time interval. This can lead to the wasting of valuable computer time, inasmuch as temperature effects which can optimize the time interval are generally ignored.

SUMMARY OF THE INVENTION

It is therefore one object of this invention to provide a new, improved and unique semiconductor memory device which greatly increases the capability of an electronic digital computer.

It is a further object of the present invention to provide an improved refresh signal generator for use in a dynamic MOS-RAM which takes into account temperature variations surrounding the memory elements in order to optimize the refresh time interval.

Briefly, in accordance with the invention, a semiconductor memory device is provided which comprises means for detecting the temperature in the vicinity of the memory element and means for controlling the refresh time interval in proportion to said detected temperature. Several embodiments are disclosed which utilize as a basic temperature detecting means a thermistor through which a capacitor is charged. The thermistor-capacitor tuning circuit is connected as an input to a NAND circuit for controlling the periodicity of the pulses therethrough in response to the detected temperature variations.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which.

DESCRIPTION OF THE PREFERRED EMBODIMENTS

Figure 1:
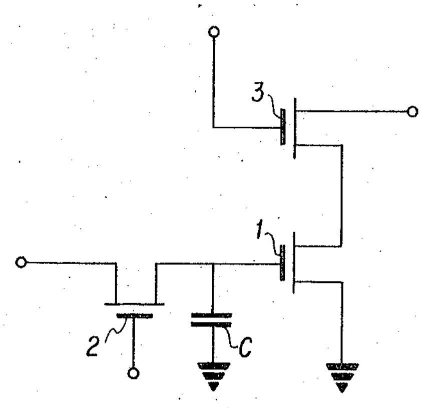
FIG. 1 illustrates a circuit schematic of a memory element representative of the prior art.
Figure 3:
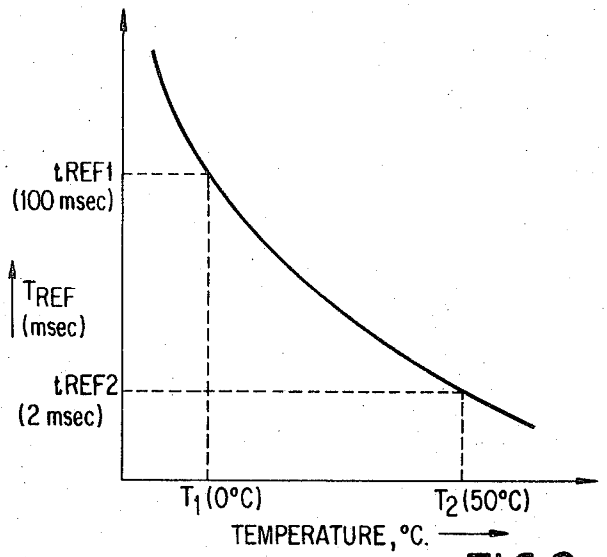
FIG. 3 is a graph showing the characteristics of the refresh action, wherein the ordinate shows the refresh time interval and the abscissa shows the temperature of the memory elements.
Figure 2:
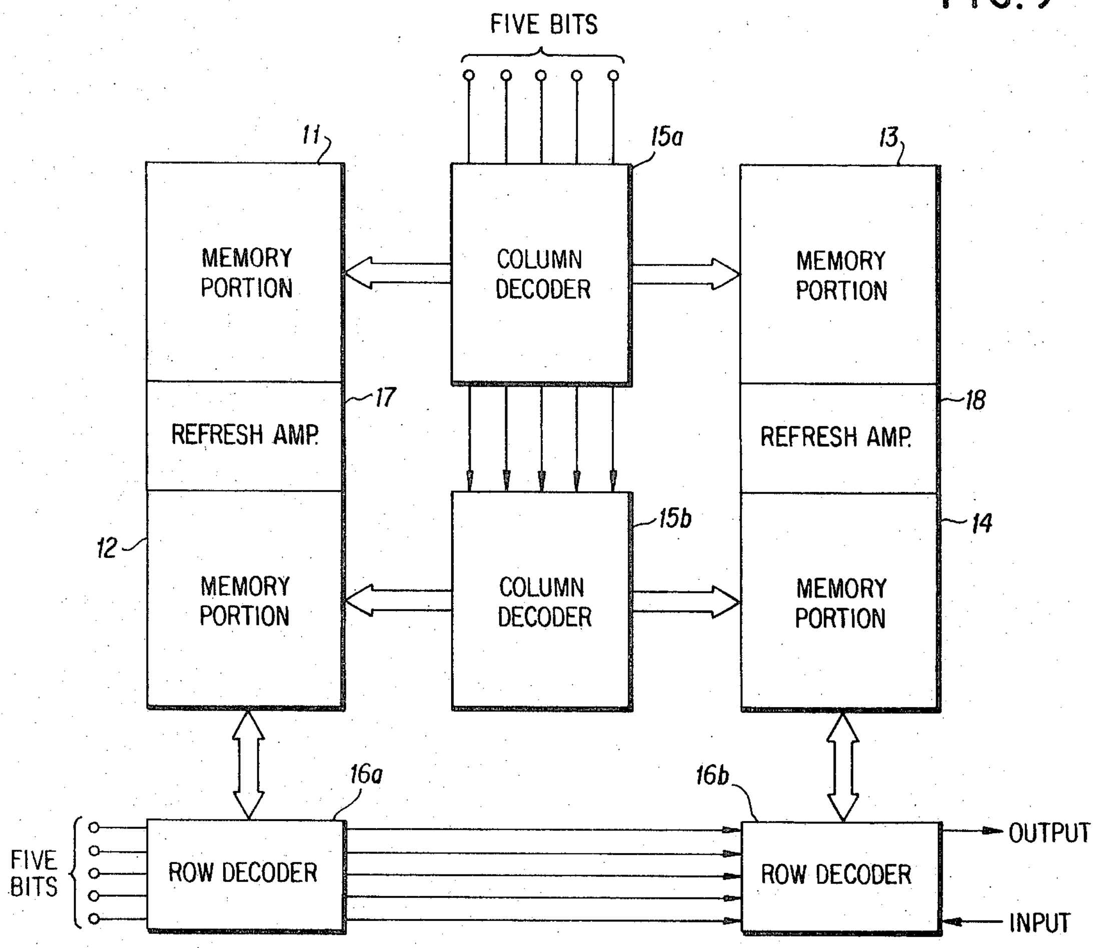
FIG. 2 is a schematic block diagram of a typical semiconductor memory device.

Referring now to the drawings, wherein like reference numerals designate identical or corresponding parts throughout the several views and more particularly to FIG. 3 thereof, there is depicted a graph illustrating the relationship between the time interval of the refresh cycle and the temperature of the memory elements. Since the leakage current of the memory elements increases in proportion to the increase of the temperature around the memory elements the refresh time interval is decreased in proportion to the increase of the temperature. In FIG. 3 the refresh time interval Tref varies from 100 m sec to 2 m sec while the ambient temperature (Ta) varies from 0°C to 50°C. If the refresh time interval is extended more than the value required for the ambient temperature, the stored information will be lost.

Figure 4:
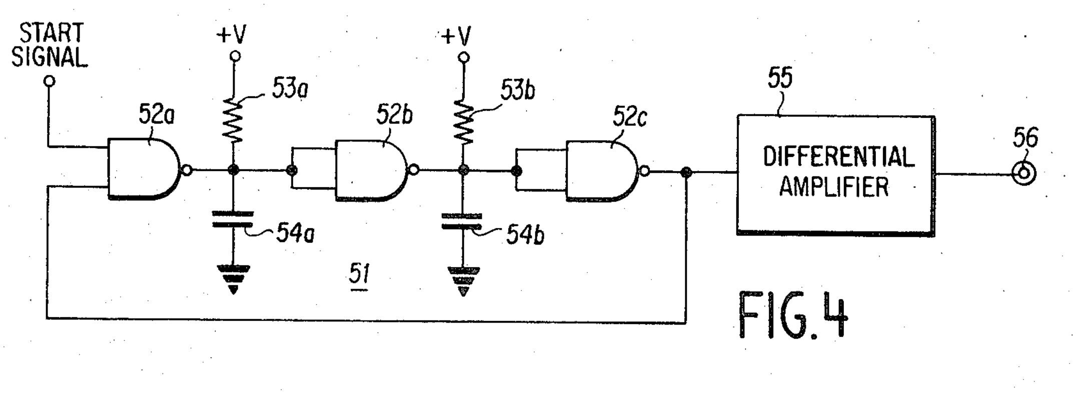
FIG. 4 illustrates a preferred embodiment of the present invention.

A preferred embodiment of the present invention is illustrated in FIG. 4, which comprises a refresh signal generator.

An astable multivibrator 51 comprises three NAND circuits 52*a*, 52*b* and 52*c* of the open collector type. A start signal is applied to one of the input terminals of NAND circuit 52*a*, and the other input terminal thereof is connected to an output terminal of the NAND circuit 52*c*. The output terminal of NAND circuit 52*a* is connected to both input terminals of NAND circuit 52*b*. A voltage +*V* is supplied to both input terminals of NAND circuit 52*b* through a termistor 53*a* which is used as a temperature detection means. (The thermistor characteristics are shown in FIG. 8).

Also, both input terminals of NAND circuit 52*b* are connected to ground through a capacitor 54*a*. The output terminal of NAND circuit 52*b* is connected to both input terminals of the next NAND circuit 52*c*. A voltage +V is supplied to both input terminals of NAND circuit 52*c* through the thermistor 53*b*, and both of said input terminals are connected to ground through a capacitor 54*b*. The output signal of NAND circuit 52*c* is the output signal of the astable multivibrator 51. This output signal is transmitted through a differential amplifier circuit 55 and is taken out from output terminal 56 as a pulse signal after differentiation. This output pulse signal is transmitted to a refresh flip flop circuit, not shown in the drawings.

Figures 5, 7, 8:
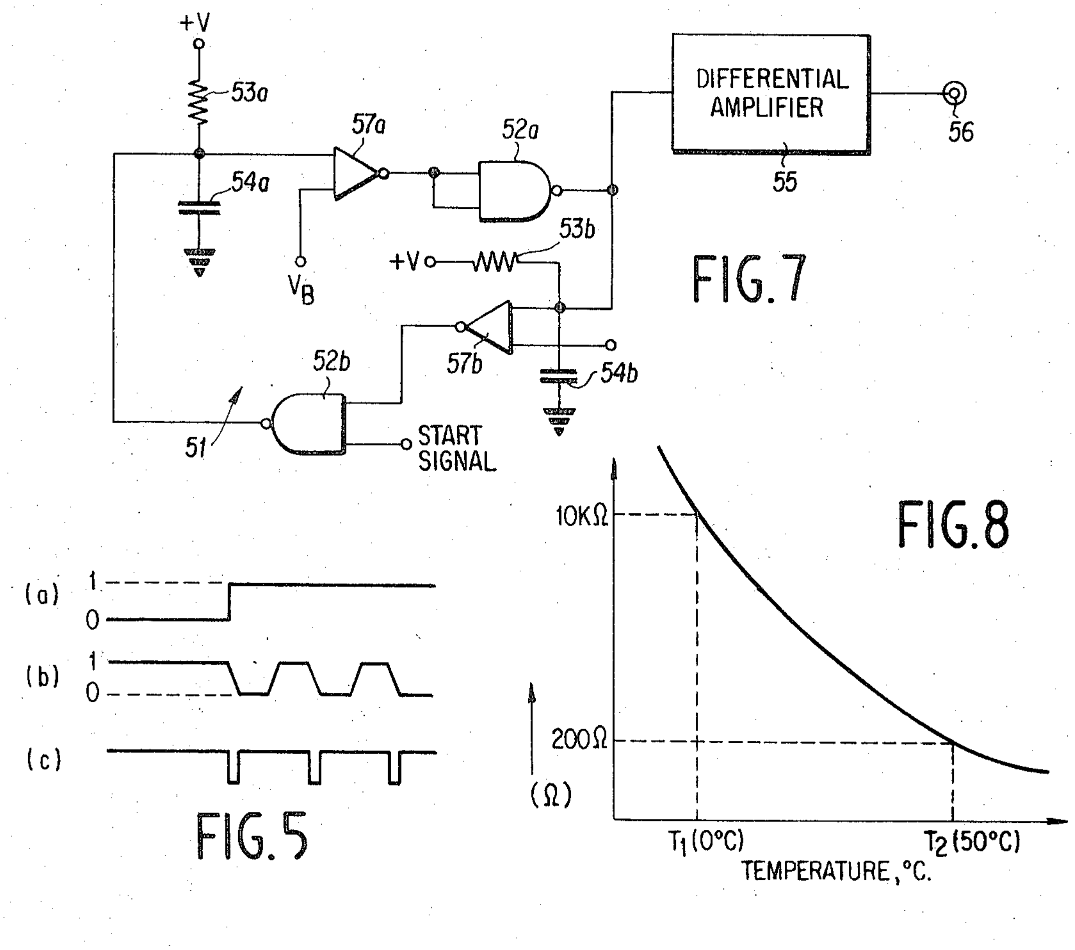
FIG. 5 shows a wave form at various stages within the circuit of FIG. 4.
FIG. 8 is a graph showing the characteristics of a thermistor utilized in the preferred embodiment circuitry.

In the operation of the above-described embodiment, a start pulse is applied to NAND circuit 52*a* as represented by the (*a*) graph of FIG. 5.

Therefore, the output signal of NAND circuit 52*a* is "1," the output signal of NAND circuit 52*b*, is "0," and the output signal of NAND circuit 52*c* is "1". The "1" signal from NAND circuit 52*c* is applied to one of the input terminals of NAND circuit 52*a*. At a certain state, if the start signal is applied and the AND condition of NAND circuit 52*a* is satisfied, that output signal becomes "0." As a result, the charge on the capacitor 54*a* is discharged instantaneously through the NAND circuit 52*b*.

The output signal of NAND circuit 52*b* becomes "1," and the discharge circuit of the capacitor 54*b* is opened. Thereafter, the charging operation to capacitor 54*b* starts through the termistor 53*b*. In this charging operation, the electric potential of capacitor 54*b* is beginning to increase, and said potential arrives at the operating voltage of NAND circuit 52*c*, i.e., the threshold voltage. The output signal of NAND circuit 52*c* then changes to "0" from "1." This output signal of NAND circuit 52*c* ultimately is fed as an input signal to NAND circuit 52*a*, whereupon the output signal of NAND circuit 52*a*, is changed to the 1 state. Therefore the discharge circuit of the capacitor 54*a* is in its open state, and the charging operation starts. Thus, the NAND circuit 52*b* reverses after a certain time according to the increase of that electric potential, therefore switching its output signal to 0. Thus, signal of NAND circuit 52*c* returns to the 1 state and the electric charge of capacitor 54*b* is discharged simultaneously through the NAND circuit 52*b*. The delay operation is carried out alternately by the time constant circuit comprising thermistors 53*a* and 53*b* and capacitors 54*a* and 54*b* and the rectangular wave signal is thereby generated as the output of NAND circuit 52*c*, as shown in waveform (*b*) of FIG. 5. This rectangular wave signal is transmitted to the differential circuit 55, and the resultant pulse signal (shown as waveform (*c*) of FIG. 5) is yielded at output terminal 56.

The resistance value of thermistors 53*a* and 53*b* decreases in proportion to the increase in the temperature around them, as illustrated in FIG. 8. Therefore, the period of the pulse signal from the output terminal 56 becomes longer as the temperature increases.

Figure 6:
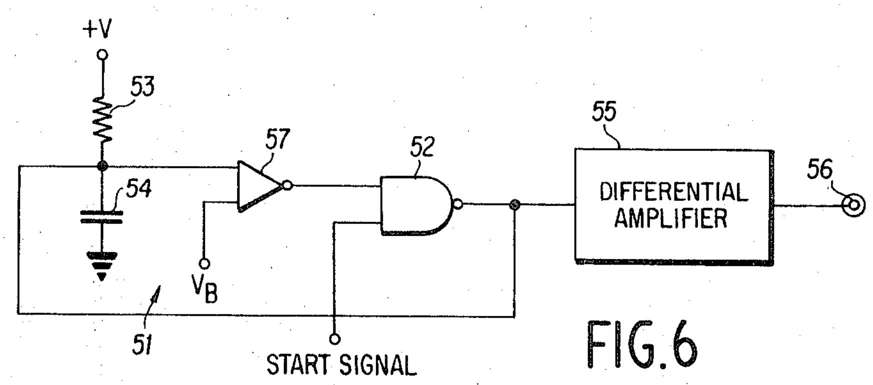
FIG. 6 and FIG. 7 illustrate other preferred embodiments of the present invention.

Another embodiment of this invention is shown in FIG. 6. The astable multivibrator 51 is comprised of NAND circuit 52 and a voltage comparator (or differential amplifier) 57. Other portions of this embodiment are the same as in FIG. 4. In FIG. 6, the output signal of NAND circuit 52 is initially in the 1 state. This 1 signal is applied to the input terminal of NAND circuit 52, through the voltage comparator 57. In this state, a starting signal is applied, the output signal of NAND circuit 52 becomes 0, and the charge on the capacitor 54 discharges instantaneously through NAND circuit 52. Then the output signal of the voltage comparator 57 becomes 0. Thus, the output signal of NAND circuit 52 changes to the 1 state from the 0 state.

If the output signal of NAND circuit 52 becomes 1, capacitor 54 begins to charge through the thermistor 53. And if said electric potential increases above voltage $V_B$ which is applied to the minus input terminal of the voltage comparator 57, the output signal of the voltage comparator 57 becomes 1, and the output signal of NAND circuit 52 reverses to the 0 state. Thus, the oscillating operation is achieved and the pulse signal is delivered through the differential amplifier circuit 55.

Still another embodiment of this invention is shown in FIG. 7, which is seen to be comprised of NAND circuits 52*a* and 52*b* and voltage comparators 57*a* and 57*b*. It is seen that this embodiment consists of the serial connection of two pairs of the oscillation circuit which comprises the NAND circuit and voltage comparator of FIG. 6. This embodiment has the feature of enabling a signal with a longer period to be obtained.

In each of the above-mentioned embodiments of this invention, the refresh time interval is controlled to depend on the detection of the ambient temperature around the memory elements by the thermistors, and in others this invention accomplishes the direct detection of temperature of the memory elements.

Therefore, it is seen that I have provided an improved semiconductor memory in which a refresh operation can be carried out more effectively than heretofore possible. Thus, unused time of an electronic computer can be greatly reduced.

Thus, this invention establishes that a refresh time interval makes use of the allowable maximum value of the memory elements to detect the temperature of or around the memory elements.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A refresh signal generator comprising:
a first NAND gate,
a second NAND gate,
a third NAND gate, a first thermistor,
a second thermistor,
a first capacitor,
a second capacitor,
said first NAND gate having a first input and a second input and an output,
said second NAND gate having a first input and a second input and an output,
said third NAND gate having a first input and a second input and an output,
means connecting a start signal to the said first input of said first NAND gate,
means connecting the output of said first NAND gate to the said first and second inputs of said second NAND gate,
means connecting the output of said second NAND gate to the said first and second inputs of said third NAND gate,
means connecting the output of said third NAND gate to the said second input of said first NAND gate,
means connecting said first thermistor between a voltage source and the said output of said first NAND gate,
means connecting said first capacitor between said output of said first NAND gate and ground,
means connecting said second thermistor between a voltage source and the output of said second NAND gate,
means connecting said second capacitor between the output of said second NAND gate and ground.

2. A refresh signal generator comprising:
a thermistor,
a capacitor,
a voltage comparator,
a NAND gate,
said voltage comparator having a first voltage input and a second input and an output,
said NAND gate having a having input and a second input and an output,
means connecting said thermistor between a voltage source and the first input of said voltage comparator,
means connecting the said capacitor between the first input of said voltage comparator and ground,
means connecting a voltage source to the second input of said voltage comparator,
means connecting the output of said voltage comparator to the first input of said NAND gate,
means connecting a start signal to the second input of said NAND gate,
means connecting the output of said NAND gate to the junction between said thermistor and said capacitor.

3. A refresh signal generator comprising:
a first resistor,
a second resistor,
a first capacitor,
a second capacitor,
a first voltage comparator having a first input and a second input and an output,
a second voltage comparator having a first input and a second input and an output,
a first NAND gate having a first input and a second input and an output,
a second NAND gate having a first input and a second input and an output,
means connecting said first thermistor between a voltage source and the first input of said first voltage comparator,
means connecting said first capacitor between the first input of said first voltage comparator and ground,
means connecting the second input of said first voltage comparator to a voltage source,
means connecting the output of said first voltage comparator to the first and second inputs of said first NAND gate,
means connecting said second thermistor between a voltage source and the first input of said second voltage comparator,
means connecting the output of said first NAND gate to the first input of said second voltage comparator,
means connecting said second capacitor between the first input of said second voltage comparator and ground,
means connecting the output of said second voltage comparator to the first input of said second NAND gate,
means connecting a start signal to the second input of said second NAND gate,
means connecting the output of said second NAND gate to the junction between said first thermistor and said first capacitor.

4. A refresh signal generator in accordance with claim 1 further including a differential amplifier connected to the output of said third NAND gate.

5. A refresh signal generator in accordance with claim 2 further including a differential amplifier connected to the output of said NAND gate.

6. A refresh signal generator in accordance with claim 3 further including a differential amplifier connected to the output of said first NAND gate and the first input of said second voltage comparator.

* * * * *